(12) United States Patent
Wygle et al.

(10) Patent No.: US 7,353,612 B1
(45) Date of Patent: Apr. 8, 2008

(54) LASER SYSTEM AND METHOD FOR ALIGNMENT OF TOOLING ONTO CORRUGATED BOX CUTTING MACHINES

(75) Inventors: Lonnie Wygle, Vinton, IA (US); Mike Hurley, Cedar Falls, IA (US)

(73) Assignee: World-B Enterprises, L.L.C., Cedar Falls, IA (US)

( * ) Notice: Subject to any disclaimer, the term of this patent is extended or adjusted under 35 U.S.C. 154(b) by 247 days.

(21) Appl. No.: 11/306,406

(22) Filed: Dec. 27, 2005

(51) Int. Cl.
*G01C 15/00* (2006.01)
(52) U.S. Cl. .................................. 33/286; 33/DIG. 21
(58) Field of Classification Search .................. 33/286, 33/262, 263, 275 R, DIG. 21, 281
See application file for complete search history.

(56) References Cited

U.S. PATENT DOCUMENTS

| | | | |
|---|---|---|---|
| 4,513,508 A | | 4/1985 | Jarman et al. |
| 4,598,481 A | * | 7/1986 | Donahue ..................... 33/288 |
| 4,630,379 A | | 12/1986 | Wickmann et al. |
| 4,703,563 A | | 11/1987 | Hoshino et al. |
| 4,718,171 A | | 1/1988 | Schlemmer et al. |
| 4,742,206 A | | 5/1988 | Dietterich et al. |
| 4,781,668 A | | 11/1988 | Mowry |
| 5,077,905 A | | 1/1992 | Murray, Jr. |
| 5,488,781 A | * | 2/1996 | Van Der Horst .............. 33/617 |
| 6,105,264 A | | 8/2000 | Phillips |
| 6,708,782 B1 | * | 3/2004 | Turney ........................ 33/286 |
| 7,219,437 B2 | * | 5/2007 | Dallman ...................... 33/286 |

* cited by examiner

*Primary Examiner*—Christopher W Fulton
(74) *Attorney, Agent, or Firm*—Ryan N. Carter

(57) ABSTRACT

An alignment device adapted to be combined with a manufacturing machine having a rotating cylinder. The device comprises at least one laser that emits a line of light across the vertical axis of the cylinder, and at least one laser that emits a line of light across the horizontal axis of the cylinder. The device further comprises measuring devices such as rulers mounted along the horizontal and vertical axis of the cylinder. In use, the lasers emit a line of light across the measuring devices and across the cylinder's surface to create an x y-axis thereon. The laser beams allow the extrapolation of the measurements from the measuring devices onto the cylinder's surface so a machinist can easily locate the precise coordinates on which to mount tooling onto the cylinder.

9 Claims, 2 Drawing Sheets

LASER SYSTEM AND METHOD FOR ALIGNMENT OF TOOLING ONTO CORRUGATED BOX CUTTING MACHINES

BACKGROUND OF THE INVENTION

The present invention relates to the field of manufacturing machines and presses having rotating cylinders and shafts, and more particularly to a laser device which aids in the alignment and placement of tooling onto the machine's cylinder or shafts.

Equipment such as rotary die presses, flexo presses, slitters, letterpresses, print die mount stations, and specialty folder gluers are utilized to cut, score, glue, and fold flat sheets of corrugated sheets into semi-finished or completely finished products. These pieces of equipment typically have a rotating cylinder and/or rotating shafts onto which are mounted various tools which have sharp edges for cutting and scoring the corrugated material as it passes through the machine. (Note that although some machines have both cylinders and shafts, cylinders and shafts will sometimes be collectively referred to herein as only "the cylinder".) Some of the tools used in these operations may include: cutting dies, printing dies, score, slit-score and slot heads (collectively referred herein to as "tools" or "tooling").

To make a flat piece of corrugated paperboard into a box or packaging of a desired shape and size, the tooling must be placed in specific locations on the cylinder of the machine. As the corrugated sheets move through the machine, the properly positioned tooling cuts, scores, slots, or prints the corrugated sheets at the desired locations. To determine the proper location that the tooling must be placed on the surface of the cylinder, the machinist must know the relative horizontal and vertical dimensions of the cylinder. For example, the specifications to make a box or other corrugated product may call for the machinist to place a tool at thirty-three inches left of the centerline on the horizontal axis, and twelve inches from the zero point on the vertical axis. The current method for determining these dimensions typically includes using a hand-held tape measure or ruler to measure the distance on the cylinder. Typical tolerances for locating tooling are less than one sixteenth of an inch. The distances are measured from a fixed position on the machine, such as the edge of the machine's sidewall frame or the center of the cylinder. The tooling is held in position on the cylinder by various attachment devices such as bolts, which the machinist drives through the tooling and into the cylinder using an electric or pneumatic hand tool.

One problem with positioning tooling in this manner is that it can be dangerous for machine operators who have their hands near the sharp edges of the tooling as they use the tape measure to hold the tooling and secure the tooling to the cylinder. Another problem with this technique is that it takes a significant amount of time for the operator to position the tooling since the operator must coordinate and manipulate the tooling, the tape measure, and the hand held tool used to secure tooling to the cylinder. Yet another problem with this technique is that the machine operator looses precision and accuracy because of the encumbrances of holding the tooling to be mounted on the press, the tape measure, and the hand-tool necessary to secure said tooling to the cylinder.

Therefore, there is a need for a device, which allows for the safe and efficient alignment of tooling onto machines having rotating cylinders and/or shafts.

SUMMARY OF THE INVENTION

The present invention is a device comprising several components which are adapted to aid in the alignment of tooling onto machines/presses having rotating cylinders and/or shafts. The device comprises at least one laser adapted to be combined with the machine so that it emits a laser beam onto the machine's cylinder in the vertical direction. This vertical-line laser is combined with the machine so that the operator can easily change the position of the laser's beam relative to the horizontal axis. The device further comprises at least one laser adapted to be combined with the machine so that it emits a laser beam onto the machine's cylinder in the horizontal direction. In addition to the lasers, the horizontal and vertical axes of the alignment device each comprise at least one measuring device, such as a conventional ruler, digital read-out ruler, or scaling board.

In use, the lasers emit a beam of light across the respective measuring devices and across the cylinder's surface to create an x y-axis thereon. The laser beams allow the extrapolation of the measurements from the measuring devices onto the cylinder's surface so a machinist can easily locate the precise coordinates on which to mount tooling onto the cylinder. For example, by aligning the laser so that the beam of light passes over the thirty-three inch mark on the measuring device, the operator knows that the laser beam also marks the thirty-three inch position on the cylinder's surface. The machine operator can then place the tooling at the laser beam's position on the cylinder rather than having to hold a tape measure in his/her hands to measure the proper placement of the tooling. The laser alignment device of the present invention allows for a greater degree of safety since the operator's hands do not need to hold a tape measure while he/she places the tooling onto the cylinder.

DESCRIPTION OF THE PREFERRED EMBODIMENT OF THE INVENTION

Figure 1:
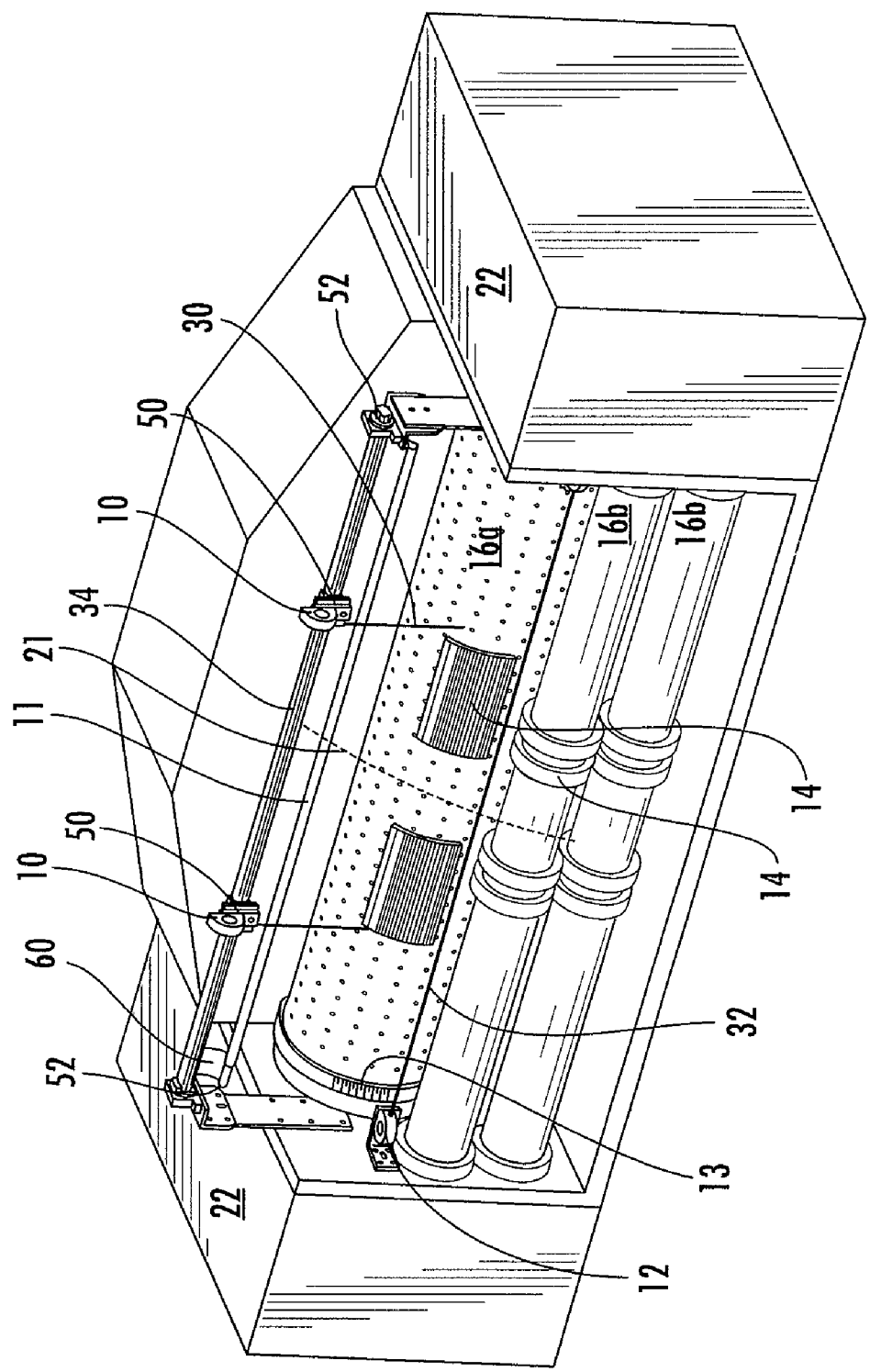
FIG. 1 is a perspective view of the components of the laser alignment device of the present invention mounted onto a typical machine.

The present invention is a device comprising components which are adapted to aid in the alignment of tooling 14 onto machines having a mounting surface such as a rotating cylinder 16a and/or a shaft(s) 16b. Although the present invention is described primarily herein with regard to corrugated packaging machinery, it should be noted that the alignment device may be used on any suitable piece of machinery, including slitters, letterpresses, print die mount stations, specialty folder gluers as well as equipment within the folding carton industry. Further, it should be noted that the term "tooling" 14 can mean any tool mountable onto any machine/press, including cutting dies, printing dies, scores, slots, hand hole attachments, inspection windows, and slit scores. Still further, although the present invention is described herein as using light from a laser, it should be noted that any suitable beam of light can be used, including a flashlight having a narrow beam.

As described in the Background section of this specification, cutting machines and presses are types of equipment used in the manufacturing of corrugated packaging. The equipment uses various tools 14 which have sharp edges for cutting, scoring, and slotting the corrugated material as it passes through the machinery. As the size and other specifications of the desired packaging changes, the position of the tooling 14 must be changed on the mounting surface 16a, 16b by the machinist. In order to place a tool 14 on the mounting surface 16a, 16b, the machinist must know the relative dimensions of the mounting surface 16a, 16b. The mounting surface's 16a, 16b horizontal dimensions are typically determined by measuring from a fixed point on the machine, such as from the centerline 21 of the mounting surface 16a, 16b or from the side frame 22 of the machine. The mounting surface's 16a, 16b vertical dimensions are typically determined by a zero-line preset by the manufacturer of the machine, or by marking an arbitrary point on the mounting surface 16a, 16b as the zero point, and measuring around the circumference of the mounting surface 16a, 16b from that zero point.

Figure 2:
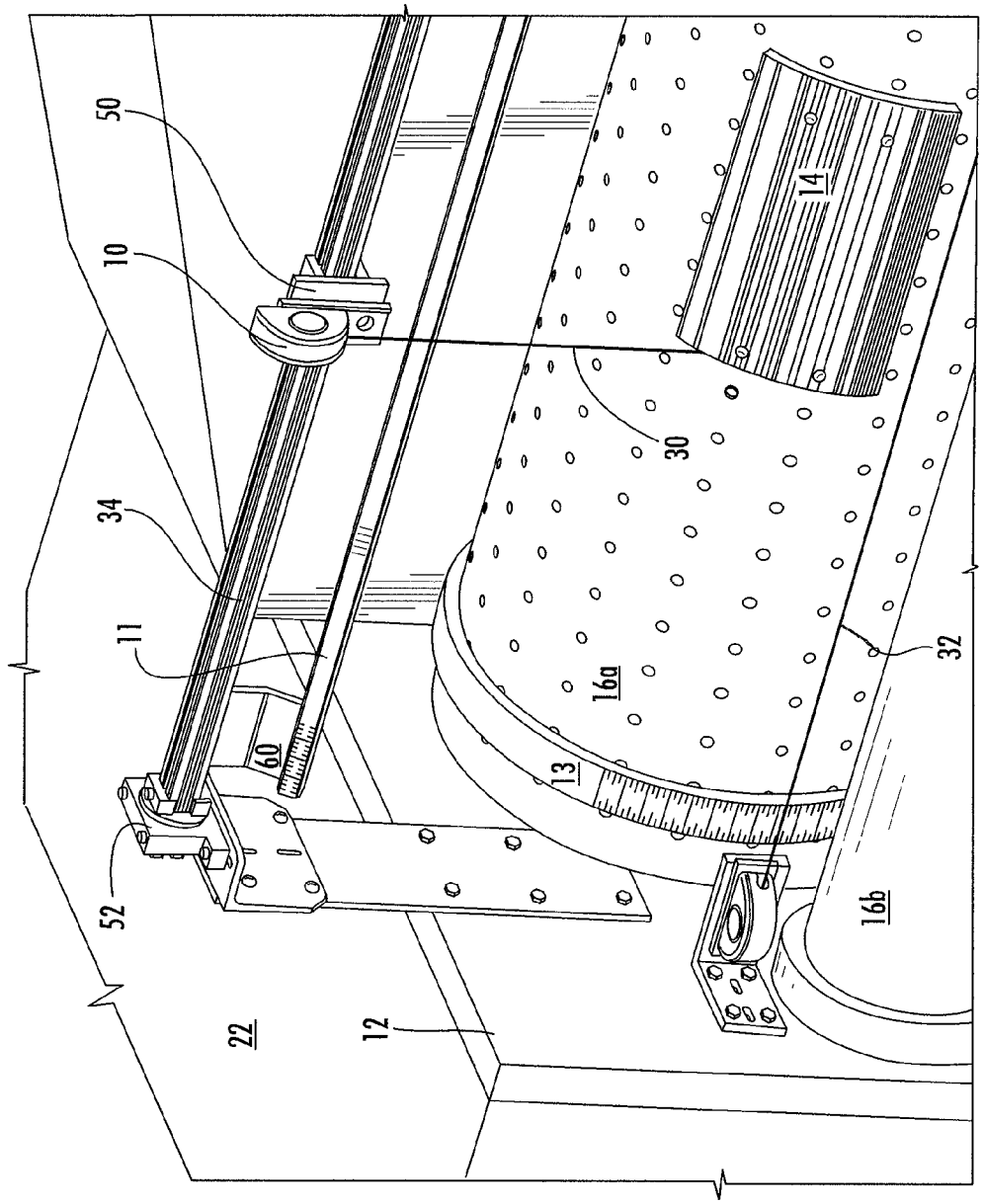
FIG. 2 is a close up perspective view of the components of the laser alignment device.

As seen in FIGS. 1 and 2, the present invention comprises a first laser 10 adapted to project a vertical line of light 30 across the mounting surface 16a, 16b, and a second laser 12 adapted to project a horizontal line of light 32 across the mounting surface 16a, 16b. The device further comprises means for measuring the relative horizontal position of the vertical beam 30 and vertical position of the horizontal beam 32. The first laser 10 (vertical beam 30) measuring device is shown as reference number 11 and is preferably a tape measure or ruler combined to the frame 22 of the machine. As shown best in FIG. 2, the measuring device 11 is preferably combined with the machine via mounting member 34. Measuring device 11 and mounting member 34 are preferably combined by angled plate 60. Angled plate 60 holds the measuring device 11 in front of the mounting member 34 so that beam 30 shines across measuring device 11.

The second laser 12 (horizontal beam 32) measuring device 13 is preferably a scaling board combined with and curved around the circumference of the mounting surface 16a, 16b as is known in the art. The laser beams 30, 32 are adapted to shine across their respective measuring device 11, 13 and the cylinder 16a and/or shaft(s) 16b. The laser beams 30, 32 allow the extrapolation of the measurements from the respective measuring device 11, 13 onto the mounting surface 16a, 16b so a machinist can easily locate the precise coordinates on which to mount tooling 14 onto the mounting surface 16a, 16b.

As seen in FIG. 1, in the preferred embodiment there are two vertical-line lasers 10 combined with the machine. The vertical-line lasers 10 are slidably combined with a mounting member 34 that extends the length of the horizontal axis of the mounting surface 16a, 16b. The slidable mounting allows the machinist to move the lasers 10 along the mounting member 34 so that the beam 30 can be moved to different positions along the length of the mounting surface 16a, 16b. This allows the machinist to align the laser beam 30 with the desired position on the measuring device 11. For example, if the specifications of the packaging requires the tooling 14 to be placed at thirty-three inches left of the center line 21, the machinist would slide the laser 10 so that it projected its beam 30 across the thirty-three inch marking on the measuring device 11 and onto the mounting surface 16a, 16b. In this manner, the machinist would know the thirty-three inch position on the mounting surface 16a, 16b without having to awkwardly hold a tape measure while mounting the tooling 14.

In addition to the slidable mounting, the vertical-line laser 10 is preferably combined with the machine so that its beam 30 can be adjusted in both its vertical and horizontal direction without sliding the laser 10 along mounting member 34. This adjustment is achieved by pivotally combining laser 10 to mounting member 34 using a first pivot bracket 50, or by pivotally combining member 34 with the frame 22 of the machine using a second pivot bracket 52. Preferably, the mounting member 34, first pivot bracket 50, or second pivot bracket 52 have a locking mechanism so the machinist can lock the laser 10 in its desired position.

Preferably, pivot bracket 50 (or pivot bracket 52) is adapted to rotate 360 degrees around its horizontal axis so as to allow laser 10 to emit its beam 30 outwardly in any direction. This pivotal mounting allows the beam 30 to be projected outward and onto the shaft(s) 16b which, depending on the length of the beam 30, may not otherwise receive the laser beam's 30 light. In other words, beam 30 may create a line of light that is only several inches long so that it cannot shine on both cylinder 16a and shaft 16b at the same time. The pivotal mounting of laser 10 allows the machinist to adjust whether beam 30 is projected onto cylinder 16a or shaft(s) 16b without changing the position of laser 10 along mounting member 34.

In addition to the above adjustment, pivot bracket 50 preferably allows laser 10 to pivot side-to-side for calibration to ensure the beam 30 is aligned in a truly vertical orientation.

As mentioned above, the device further comprises at least one laser 12 combined with the machine so as to produce a horizontal-line laser beam 32 across the mounting surface 16a, 16b. The horizontal-line laser 12 serves the same tooling 14 alignment purpose as the vertical-line laser described above, except the horizontal-line laser's beam 32 projects horizontally across the cylinder 16 for determining relative vertical measurements. The horizontal-line laser 12 is preferably combined with the machine so that it can pivot on its mounting axis. This pivot is for calibration purposes to ensure the laser's 12 beam 32 is aligned in a truly horizontal orientation.

As mentioned above, the lasers 10, 12 are adapted to project a line of laser light rather than merely a point of light. The projection of the line of light 30, 32 allows the machinist to extrapolate the measurement shown on the measuring device 11, 13 onto the mounting surface 16a, 16b. The laser beam 30, 32 can be produced by any suitable lasers including AC powered or DC powered lasers, or other sources for projecting light.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is:

1. An alignment device for aiding in the placement of tooling onto a machine having a mounting surface for receiving the tooling, wherein the mounting surface has a horizontal axis and a vertical axis, the alignment device comprising:
   a first light source combined with the machine so as to emit a first beam of light along at least a portion of the vertical axis of the mounting surface;
   a first measuring device combined with the machine to measure distance along the horizontal axis of the mounting surface;
   wherein the first beam of light is emitted onto the first measuring device and the mounting surface to allow for the extrapolation of the measurements from the first measuring device onto the mounting surface;

a second light source combined with the machine adapted to emit a second beam along at least a portion of the horizontal axis of the mounting surface;

a second measuring device combined with the mounting surface to measure distance along the vertical axis of the mounting surface;

wherein the second beam of light is emitted onto the second measuring device and the mounting surface to allow for the extrapolation of the measurements from the second measuring device onto the mounting surface;

wherein the mounting surface is a cylinder adapted for rotation around its horizontal axis.

2. The device of claim 1 wherein the first and second light sources are lasers.

3. The device of claim 1 wherein the first measuring device is a digital readout ruler.

4. An alignment device for aiding in the placement of tooling onto a machine having a mounting surface for receiving the tooling, wherein the mounting surface has a horizontal axis and a vertical axis, the alignment device comprising:

a first light source combined with the machine so as to emit a first beam of light along at least a portion of the vertical axis of the mounting surface;

a first measuring device combined with the machine to measure distance along the horizontal axis of the mounting surface;

wherein the first beam of light is emitted onto the first measuring device and the mounting surface to allow for the extrapolation of the measurements from the first measuring device onto the mounting surface;

a second light source combined with the machine adapted to emit a second beam along at least a portion of the horizontal axis of the mounting surface;

a second measuring device combined with the mounting surface to measure distance along the vertical axis of the mounting surface;

wherein the second beam of light is emitted onto the second measuring device and the mounting surface to allow for the extrapolation of the measurements from the second measuring device onto the mounting surface;

wherein the mounting surface is a shaft adapted for rotation around its horizontal axis.

5. An alignment device for aiding in the placement of tooling onto a machine having a mounting surface for receiving the tooling, wherein the mounting surface has a horizontal axis and a vertical axis, the alignment device comprising:

a first light source combined with the machine so as to emit a first beam of light along at least a portion of the vertical axis of the mounting surface;

a first measuring device combined with the machine to measure distance along the horizontal axis of the mounting surface;

wherein the first beam of light is emitted onto the first measuring device and the mounting surface to allow for the extrapolation of the measurements from the first measuring device onto the mounting surface a second light source combined with the machine adapted to emit a second beam along at least a portion of the horizontal axis of the mounting surface;

a second measuring device combined with the mounting surface to measure distance along the vertical axis of the mounting surface;

wherein the second beam of light is emitted onto the second measuring device and the mounting surface to allow for the extrapolation of the measurements from the second measuring device onto the mounting surface;

a mounting member combined with the machine along its horizontal axis;

wherein the first light source is slidably combined with the mounting member;

wherein the mounting surface comprises a cylinder combined with the machine along a first horizontal axis and a shaft combined with the machine along a second horizontal axis.

6. The device of claim 5 wherein the mounting member is pivotally combined with the machine so that pivoting the mounting member projects the first light source's beam from a first position wherein the first light source's beam is directed onto the cylinder, to a second position wherein the first light source's beam is directed onto the shaft.

7. The device of claim 5 wherein the first light source is combined to the mounting member by a pivot bracket adapted to allow the light source to pivot relative to the mounting member so that pivoting the pivot bracket projects the first light source's beam from a first position wherein the first light source's beam is directed onto the cylinder, to a second position wherein the first light source's beam is directed onto the shaft.

8. A method for aiding in the placement of tooling onto a machine having a mounting surface adapted for tooling to be combined therewith, the mounting surface having a horizontal axis and a vertical axis, the alignment method comprising:

projecting a first beam of light vertically across a first measuring device and onto the mounting surface;

aligning the first beam so as to project across the first measuring device at a desired first position;

projecting a second beam of light horizontally across a second measuring device and onto the mounting surface;

aligning the second beam so as to project across the second measuring device at a desired second position; and securing tooling onto the mounting surface using the desired first and second positions illuminated by the first and second beams of light.

9. The method of claim 8 wherein the first and second beams of light intersect on the mounting surface.

* * * * *